United States Patent
Jojic et al.

(10) Patent No.: US 6,674,877 B1
(45) Date of Patent: Jan. 6, 2004

(54) SYSTEM AND METHOD FOR VISUALLY TRACKING OCCLUDED OBJECTS IN REAL TIME

(75) Inventors: Nebojsa Jojic, Oak Park, IL (US); Matthew A. Turk, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/496,996

(22) Filed: Feb. 3, 2000

(51) Int. Cl.$^7$ .................................................. G06K 9/00

(52) U.S. Cl. ..................... 382/103; 382/154; 382/107; 382/118; 382/173; 348/169

(58) Field of Search ................................ 382/103, 285, 382/154, 173, 107, 104, 106, 118; 348/43, 48, 169, 208.14; 706/52; 345/848, 419; 342/90

(56) References Cited

U.S. PATENT DOCUMENTS

| 5,179,441 A | * | 1/1993 | Anderson et al. ............. 348/43 |
| 5,359,362 A | * | 10/1994 | Lewis et al. ................ 348/14.1 |
| 5,710,875 A | * | 1/1998 | Harashima et al. ......... 345/419 |

(List continued on next page.)

OTHER PUBLICATIONS

Azarbayejani a., Wren C., and Pentland A. Real–Time 3–D Tracking of the Human Body. MIT Media Laboratory Perceptual Computing Section Technical Report No. 374. Appears in Proceedings of IMAGE'COM 96, Bordeaux, France, May 1996. pp. 1–6.

ICCV submission No.: 517. Tracking Self–Occluding Articulated Objects in Dense Disparity Maps.

Bregler C, Malik J. Tracking people with twists and exponential maps. [Conference Paper] Proceedings. 1998 IEEE Computer Society Conference on Computer Vision and Pattern Recognition (Cat. No.98CB36231). IEEE Comput. Soc. 1998, pp. 8–15.

Eveland C, Konolige K, Bolles RC. Background modeling for segmentation of video–rate stereo sequences. [Conference Paper] Proceedings. 1998 IEEE Computer Society Conference on Computer Vision and Pattern Recognition (Cat. No.98CB36231). IEEE Comput. Soc. 1998, pp. 266–71.

Wren CR, Pentland AP. Dynamic models of human motion. [Conference Paper] Proceedings Third IEEE International Conference on Automatic Face and Gesture Recognition (Cat. No.98EX107). IEEE Comput. Soc. 1998, pp. 22–7.

Bregler C. Learning and recognizing human dynamics in video sequences. [Conference Paper] Proceedings. 1997 IEEE Computer Society Conference on Computer Vision and Pattern Recognition (Cat. No. 97CB36082). IEEE Comput. Soc. 1997, pp.568–74.

(List continued on next page.)

*Primary Examiner*—Bhavesh M. Mehta
*Assistant Examiner*—Barry Choobin
(74) *Attorney, Agent, or Firm*—Lyon & Harr L.L.P.; Craig S. Fischer

(57) ABSTRACT

The present invention is embodied in a system and method for digitally tracking objects in real time. The present invention visually tracks three-dimensional (3-D) objects in dense disparity maps in real time. Tracking of the human body is achieved by digitally segmenting and modeling different body parts using statistical models defined by multiple size parameters, position and orientation. In addition, the present invention is embodied in a system and method for recognizing mutual occlusions of body parts and filling in data for the occluded parts while tracking a human body. The body parts are preferably tracked from frame to frame in image sequences as an articulated structure in which the body parts are connected at the joints instead of as individual objects moving and changing shape and orientation freely.

55 Claims, 5 Drawing Sheets

U.S. PATENT DOCUMENTS

| | | | |
|---|---|---|---|
| 5,727,080 A | * | 3/1998 | Cox et al. .................... 382/168 |
| 5,917,936 A | * | 6/1999 | Katto ......................... 382/154 |
| 5,917,937 A | * | 6/1999 | Szeliski et al. ............. 382/154 |
| 6,047,078 A | * | 4/2000 | Kang .......................... 382/107 |
| 6,115,052 A | * | 9/2000 | Freeman et al. ............ 345/473 |
| 6,301,370 B1 | * | 10/2001 | Steffens et al. ............. 382/103 |
| 6,314,211 B1 | * | 11/2001 | Kim et al. ................... 382/285 |
| 6,326,972 B1 | * | 12/2001 | Buhler et al. ................ 345/474 |
| 6,381,302 B1 | * | 4/2002 | Berestov ...................... 378/41 |
| 6,434,260 B1 | * | 8/2002 | Soferman et al. ........... 382/131 |
| 6,499,025 B1 | * | 12/2002 | Horvitz et al. ................ 706/52 |
| 6,526,161 B1 | * | 2/2003 | Yan ............................. 382/118 |
| 2002/0110273 A1 | * | 8/2002 | Dufour ........................ 382/154 |
| 2003/0038875 A1 | * | 2/2003 | Ivanov et al. ................. 384/43 |

OTHER PUBLICATIONS

Wren C., Azarbayejani A., Darrell T., Pentland A. Pfinder: Real–Time Tracking of the Human Body. IEEE Trans. PAMI, Jul. 1997, vol. 19, No. 7, pp. 780–785.

Azarbayejani A., Pentland A. Real–time self–calibrating stereo person tracking using 3–D shape estimation from blob features. [Conference Paper] Proceedings of the 13th International Conference on Pattern Recognition. IEEE Comput. Soc. Press. Part vol.3, 1996, pp. 627–32 vol. 3.

* cited by examiner

SYSTEM AND METHOD FOR VISUALLY TRACKING OCCLUDED OBJECTS IN REAL TIME

BACKGROUND OF THE INVENTION

1. Field of the Invention

The present invention relates in general to object detection and tracking, and in particular, to a system and method for visually tracking three-dimensional (3-D) articulated self occluded objects or multiple occluded objects, in real-time using dense disparity maps.

2. Related Art

Efficient and accurate tracking of non-rigid motion of three-dimensional (3-D) objects in image sequences is very desirable in the computer vision field. Non-rigid tracking is generally divided into studies of two categories of motion: deformable object motion and the motion of an articulated object. The latter is of great interest to the HCI (human computer interaction) community because the human body is an articulated object. Current commercially available motion capture systems are based on magnetic or optical trackers. These trackers usually require a human subject (the articulated object to be tracked) to wear a special suit with markers on it or require the human subject to be directly attached to the system by cumbersome cables. Therefore, what is needed is a passive sensing object tracking system that is convenient, less constraining, and suitable for a variety of object tracking uses.

Although there have been several vision-based approaches to human body tracking, ranging from detailed model-based approaches to simplified, but fast statistical algorithms and cardboard models, there is a need for an accurate and efficient system for real-time tracking of articulate objects. For example, in one previous system, "Pfinder: real-time tracking of the human body" by C. Wren, A. Azarbayejani, T. Darrell, A. Pentland, IEEE Transactions on Pattern Analysis & Machine Intelligence, vol.19, no.7, pp.780–5, July 1997, two-dimensional (2-D) tracking was achieved with Gaussian modeling of a set of pixels in the image sharing some kind of similarity. However, this system was limited due to the 2-D based Gaussian modeling. As such, what is also needed is an object tracking system that uses 3D Gaussian modeling. It should be noted that in this prior system and in most object tracking systems each set of pixel is commonly referred to as a "blob".

In "Real-time self-calibrating stereo person tracking using 3-D shape estimation from blob features" by A. Azarbayejani, A. Pentland, Proceedings of the 13th International Conference on Pattern Recognition, vol. 3, pp.627–32, 1996, in order to track human motion in full 3-D, the above approach was extended by using input from two cameras for upper body tracking. However, in this system, only the hands and head were tracked while the position and orientation of the torso and lower and upper arms were ambiguous, and the two cameras used in this system were not used to calculate a dense disparity map, but rather to estimate 2-D blob parameters in each image. Thus, what is additionally needed is an articulated object tracking system that calculates disparity maps and 3-D object maps.

In "Dynamic models of human motion" by C. Wren, A. Pentland, Proceedings Third IEEE International Conference on Automatic Face and Gesture Recognition, pp.22–7, 1998, an Extended Kalman Filter was used to impose articulation constraints on portions of the body to provide a guess about the full posture. However, since only three points are measured on a human body, there was not enough information for unambiguous posture tracking. Typically, knowledge of the dynamics of human motion is helpful for tracking, as discussed in the "Dynamic models of human motion" reference. Therefore what is further needed is an object tracking system that can provide enough information for unambiguous posture tracking.

In "Model-based tracking of self-occluding articulated objects" by J. Rehg and T. Kanade, Proceedings 1995 International Conference on Computer Vision, pp. 35–46, 1995, a model-based approach to tracking self-occluding articulated structures was proposed. However, the algorithm was based on template matching and was sensitive to lighting changes. Hence, what is also needed is a tracking system that uses stereo cues so that the disparity computed based on correlation is less sensitive to the intensity changes.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in a system and method for digitally tracking objects in real time. The present invention visually tracks three-dimensional (3-D) objects in real-time using dense disparity maps.

The present invention digitally tracks articulated objects, such as a human body, by digitally segmenting and modeling different body parts using statistical models defined by multiple size parameters, position and orientation. In addition, the present invention is embodied in a system and method for recognizing mutual occlusions of body parts and filling in data for the occluded parts while tracking a human body. The body parts are preferably tracked from frame to frame in image sequences as an articulated structure in which the body parts are connected at the joints instead of as individual objects moving and changing shape and orientation freely.

Specifically, the present invention uses input from multiple cameras suitably spaced apart. A disparity map is computed at a predefined frame rate with well known and readily available techniques, such as the technique described in "Background modeling for segmentation of video-rate stereo sequences" by C. Eveland, K. Konolige, R. Bolles, Proceedings 1998 IEEE Computer Society Conference on Computer Vision and Pattern Recognition, pp.266–71, 1998, which is herein incorporated by reference. The present invention uses this information based on a generative statistical model of image formation specifically tuned to fast tracking in the presence of self-occlusions among the articulated 3-D Gaussian models.

This model is a graphical model, such as a Bayesian network, that can be used for diverse applications at formalizing generative processes in ways that allow probabilistic inference. Preferably, a maximum likelihood estimate of the posture of an articulated structure is achieved by a simplified, but very fast inference technique that consists of two stages. In the first stage, the disparity map is segmented into different parts of the articulated structure based on the estimated state of the Gaussian mixture using the maximum likelihood principle with an additional mechanism for filling in the missing data due to occlusions. The statistical properties of the individual parts are then re-estimated. In the second stage of the inference technique of the present invention, an extended Kalman Filter (EKF) enforces the articulation constraints and can also improve the tracking performance by modeling the dynamics of the tracked object. Also, it should be noted that the present invention can be simplified and used to track independent self occluding objects without articulation constraints.

The present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

I. Introduction

The present invention is a system and method for performing motion analysis and real-time digital tracking of static and dynamic three-dimensional (3-D) objects, such as articulated structures, including the human body, in dense disparity maps derived from stereo image sequences. The system and method of the present invention can be embodied in software, hardware or firmware. A statistical image (graphical) formation model is used to statistically generate digital data representing the articulated object. Also, the statistical image formation model can have a module that accounts for occlusions of portions of the objects to enhance results. The image model (which can be a Bayesian network) preferably assumes that the range image of each part of the structure is formed by deriving the depth candidates from a 3-D Gaussian distribution.

The Gaussian distribution of the present invention preferably takes into account occlusions by picking the minimum depth (which could be regarded as a probabilistic version of z-buffering). The model of the present invention also enforces articulation constraints among the parts of the structure. The system and method of the present invention formulates tracking of the object as an inference issue in the image formation model. As a result, the model of the present invention can be extended and used for numerous tracking tasks and for estimating probability distribution functions instead of maximum likelihood (ML) estimates of tracked parameters. For the purposes of illustration, the real-time tracking example of the present invention described in detail below uses certain approximations in the inference process to produce a real-time two-stage inference process. In this real-world example, results are described for tracking motion of the upper portion of the human body in real time and in the presence of self-occlusions.

II. Exemplary Operating Environment

Figure 1:
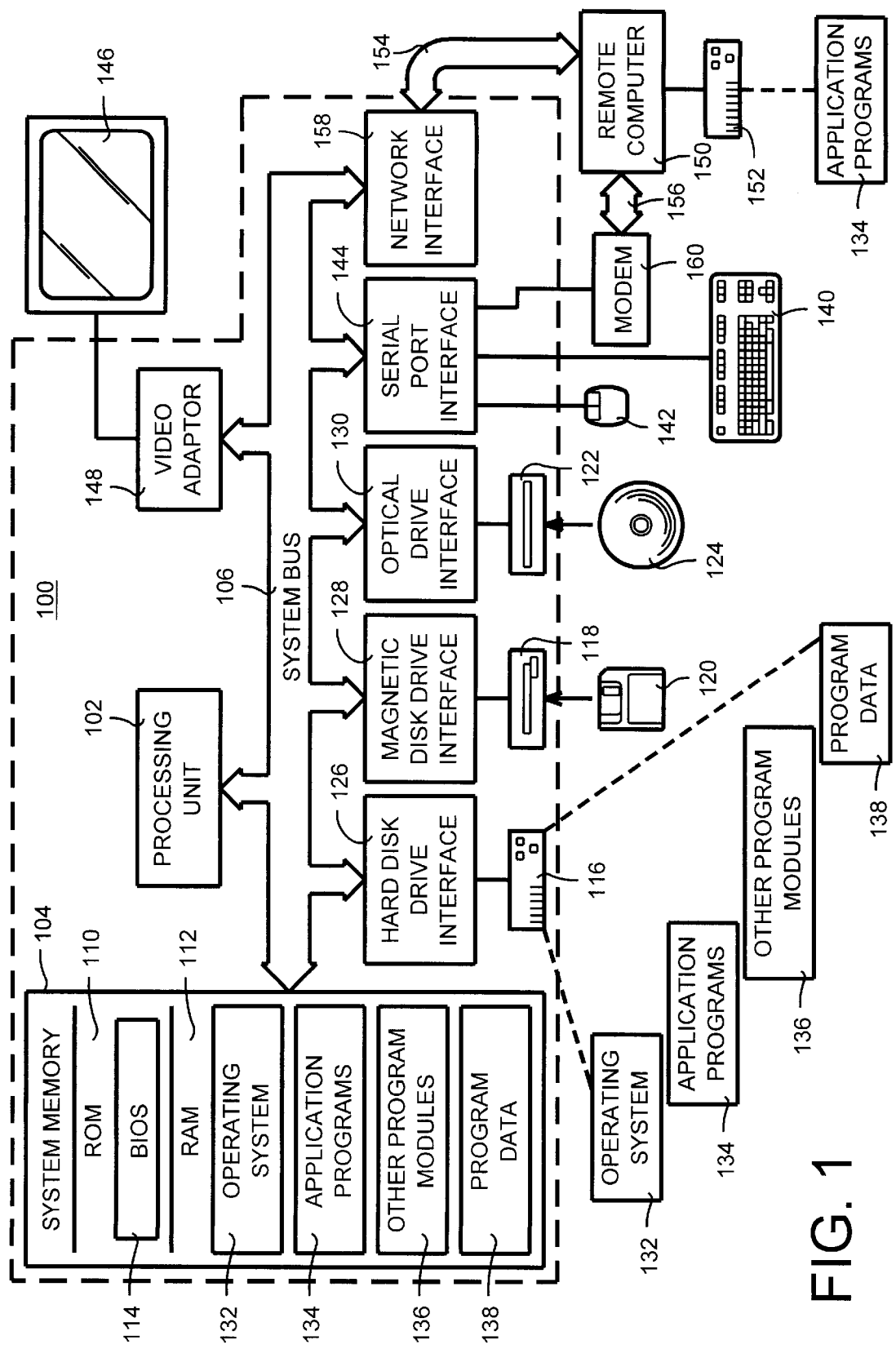
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general purpose computing device in the form of a conventional computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes computer storage media in the form of read only memory (ROM) 110 and random access memory (RAM) 112. A basic input/output system 114 (BIOS), containing the basic routines that helps to transfer information between elements within computer 100, such as during start-up, is stored in ROM 110. The computer 100 may include a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide storage of computer readable instructions, data structures, program modules and other data for the computer 100. Although the exemplary environment described herein employs a hard disk, a removable magnetic disk 120 and a removable optical disk 124, it should be appreciated by those skilled in the art that other types of computer readable media can store data that is accessible by a computer. Such computer readable media can be any available media that can be accessed by computer 100. By way of example, and not limitation, such computer readable media may comprise communication media and computer storage media. Communication media typically embodies computer readable instructions, data structures, program modules or other data in a modulated data signal such as a carrier wave or other transport mechanism and includes any information delivery media. The term "modulated data signal" means a signal that has one or more of its characteristics set of changed in such a manner as to encode information in the signal. By way of example, and not limitation, communication media includes wired media such as wired network or direct wired connection, and wireless media such as acoustic, RF, infrared and other wireless media. By way of example, and not limitation, communication media includes wired media such as a wired network or direct wired connection, and wireless media such as acoustic, RF, infrared and other wireless media. Computer storage media includes any method or technology for the storage of information such as computer readable instructions, data structures, program modules or other data. By way of example, such storage media includes RAM, ROM, EPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can be accessed by computer 100. Combinations of any of the above should also be included within the scope of computer readable media.

A number of program modules may be stored on the hard disk, magnetic disk 120, optical disk 124, ROM 110 or RAM 112, including an operating system 132, one or more application programs 134, other program modules 136, and program data 138. A user may enter commands and information into the computer 100 through input devices such as a keyboard 140 and pointing device 142. Other input devices (not shown) may include a video capture device or a camera for inputting still images or video sequences, microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, computers may also include other peripheral output devices (not shown), such as speakers and printers.

The computer 100 may operate in a networked environment using logical connections to one or more remote computers, such as a remote computer 150. The remote computer 150 may be a personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the computer 100 is connected to the local network 154 through a network interface or adapter 158.

When used in a WAN networking environment, the computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the computer 100, or portions thereof, may be stored in the remote memory storage device. It will be appreciated that the network connections shown are exemplary and other means of establishing a communications link between the computers may be used.

III. General Overview

A. Components

Figure 2:
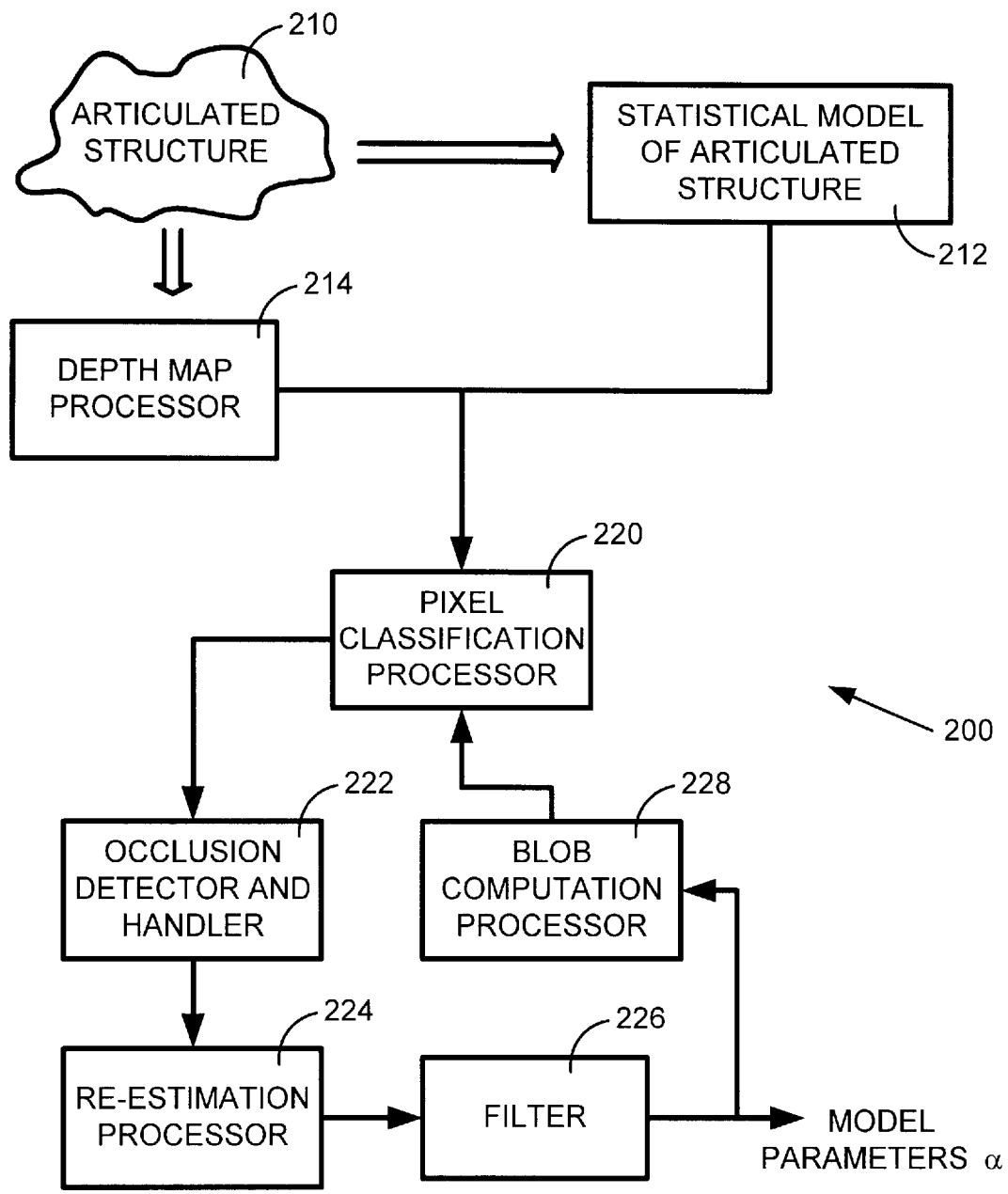
FIG. 2 is an overview block diagram of the present invention.

FIG. 2 is an overview flow diagram of the present invention. The system 200 of the present invention digitally tracks objects, such as articulated structures (for example, human bodies) in real time. In general, the system 200 includes a predefined statistical model 212 of each articulated structure 210, a depth map processor 214, a pixel classification processor 220, an occlusion detector and handler 222, a re-estimation processor 224, an enhancing filter 226, and a blob computation processor 228. The system and method of the present invention can be embodied in software, hardware or firmware.

For an articulated structure, such as a human body, the statistical model is preferably a Gaussian model parametrically defined with body segments or body parts. The Gaussian model of the present invention is a statistical model that has two parameters, the mean value and the covariance matrix. The likelihood of a particular measurement depends on the distance from the mean value, but the covariance matrix also places different emphases to different components of that distance, thus being able to allow more variability in one direction than in another. The covariance matrix is related to an ellipsoid describing the amount of variation in different directions. If the eigenvalues of this matrix are fixed, all that changes in the ellipsoid are is its position and orientation in space, but not the shape of it. As such, the 3-D Gaussian with fixed eigenvalues can be used as a rough model of a body part.

The depth map processor 214 computes range image data, the pixel classification processor 220 classifies pixels within body part segments and the occlusion detector and handler 222 estimates missing data and resolves this missing data as occluded body parts. The re-estimation processor 224 re-computes statistical parameters of the Gaussian models for different body parts, the enhancing filter 226 enhances these re-estimations and the blob computation processor 228 computes individual Gaussian model parameters. These components, their respective operations and the interaction between these components will be discussed in detail below.

B. Operation

Figure 3A:
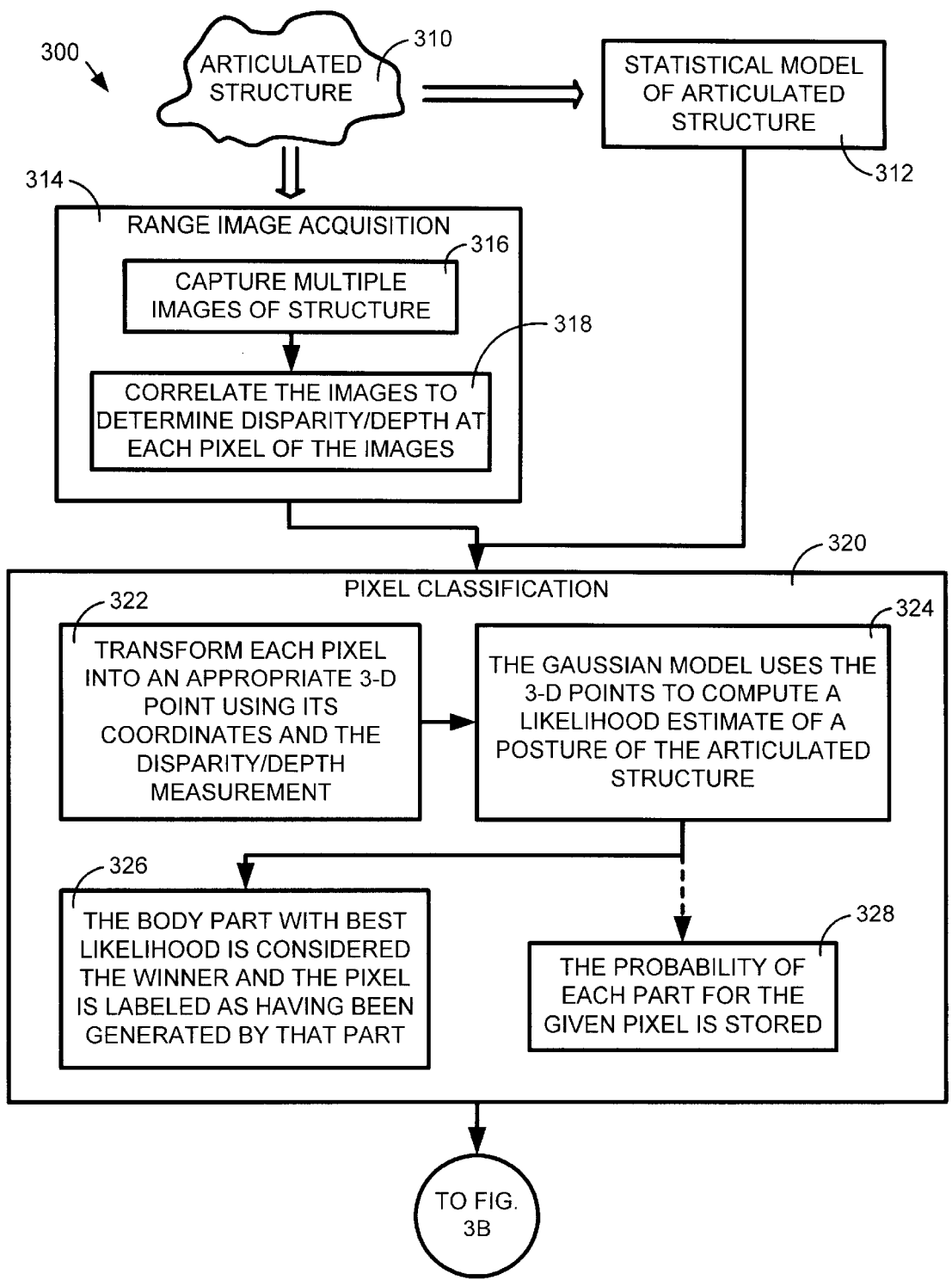
FIGS. 3A and 3B are overview flow diagrams of the present invention.
Figure 3B:
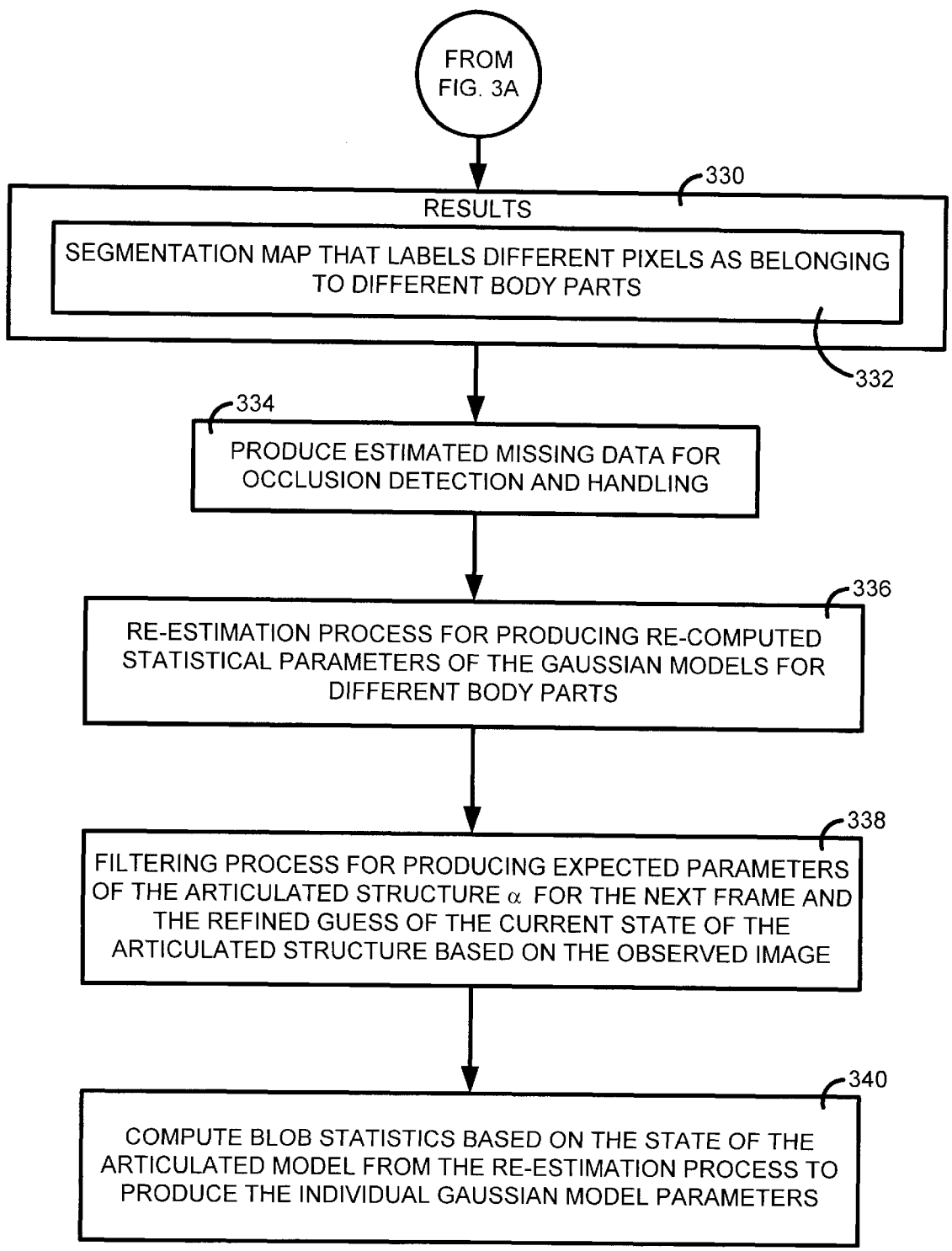

FIGS. 3A and 3B are overview flow diagrams of the present invention. Referring to FIG. 2 along with FIGS. 3A and 3B, first, the statistical model 212 is defined (step 312). Second, the depth map processor 214 acquires range image data (step 314) by initially capturing multiple images of the structure (step 316) and then correlating the images captured to determine a disparity (depth) at each pixel of the images (step 318). Third, the range image data computed from the disparity map at a current time step or particular frame and estimated (expected) parameters of the statistical models for body parts (Gaussian parameters) at that particular frame are used by the pixel classification processor 220 to examine and classify each pixel of the image as belonging to a certain body part of the statistical model (step 320).

The pixel classification process (step 320) is accomplished by determining the coordinates of each pixel and using these coordinate determinations along with the disparity (depth) measurement to transform each pixel into an appropriate 3-D point (step 322). The Gaussian model then uses the 3-D points for each pixel to compute a likelihood estimate of a posture of the articulated structure (step 324). Next, the body part of the Gaussian model with the best likelihood estimate of a particular pixel is considered the winner and the particular pixel is labeled as having been generated by that body part (step 326). Alternatively, the body part of the Gaussian model with the best likelihood estimate of the particular pixel is labeled and stored having a quantified probability that it was generated by that body part (step 328). Referring to FIG. 3B, the pixel classification process (step 320) then produces results (step 330) comprised of a segmentation map that labels different pixels as belonging to different body parts (step 332).

Fourth, the segmentation map, the Gaussian parameters and the range image data of the depth map are used by the occlusion detector and handler 222 to produce estimated missing data for occlusion detection and handling (step 334). In particular, for each body part, occlusion detection and handling produces a set of additional 3D points that are close to what should have been visually seen (but was not visually seen due to occlusion) at the occluded parts of the body. Alternatively, a fuzzy version of the above information, i.e. the probability of occlusion for each pixel and the best estimate of the occluded values can be produced.

Occlusion detection and handling (step 334) is accomplished by computing for each pixel an optimum depth value expected to be formed by each body part of the statistical body part model (3D Gaussian blob). If the optimum value according to some body part k is significantly larger than the measured value, and the segmentation map has some other part recorded as the winner in the pixel classification process (step 320), then occlusion of the body part is assumed. In case of occlusion, the optimum measurement is added as the measurement for this body part, effectively filling in the occluded missing data. Alternatively, instead of making a hard decision which part won in the pixel classification process (step 320), probabilities of different parts for each pixel may exist. The missing data can be added in probabilistic form, where with each added point a weight is added to control how much it affects further processing, namely re-estimation of Gaussian model (blob) statistics during a re-estimation process (step 336).

Fifth, the re-estimation processor 224 uses the segmentation map, the range image data of the depth map, and estimated missing data from the occlusion detection and handling step (step 334) to produce re-computed statistical parameters of the Gaussian models for different body parts (i.e., means and covariance matrices) during a re-estimation process (step 336). Specifically, this is accomplished by estimating the mean for a body part by averaging all the 3D points corresponding to the pixels associated with that body part in the segmentation map (produced by the pixel classification processor 220 of process 320) and all the estimated missing data (produced by the occlusion detector and handler 222 of process 334). Also, covariance matrices are computed using the segmentation map and the estimated missing data. Alternatively, if the fuzzy approach is used by the occlusion and detection handling process 334, each measured and missing point will have weights to be included in the computation of means and covariance matrices of different parts.

Sixth, the estimated means and covariance matrices from the re-estimation process (step 336) and the estimated speed/acceleration parameters of all parts are used by the enhancing filter 226 during a filtering process (step 338) based on the articulation model. The filtering process (step 338) produces the expected parameters of the articulated structure $\alpha$ for the next frame and the refined guess of the current state of the articulated structure based on the observed image. An Extended Kalman Filter (EKF) based on the articulation model can be used by the filtering process to produce the expected parameters.

In the filtering process (step 338), nonlinear equations are related to the state of the articulated model with means and covariance matrices $\{\beta_k\}$, which will be described in detail below. Included are the assumptions of constant size of a body part and kinematic chain equations describing how the parts are connected in the structure. The dynamics of the model can be captured by a linear system, such as a transition matrix. With Extended Kalman Filters (EKFs), the nonlinear equations are linearized and the state $\alpha$ is found that best fits the dynamics of the system and the measurements (in this case, the best guess at the individual body part statistics).

Last, the blob computation processor 228 computes blob statistics (step 340) based on the state of the articulated model from the re-estimation process (step 336) to produce Gaussian model parameters (means and covariance matrices for different body parts). The Gaussian model parameters are then used by the pixel classification process (step 320). In other words, the Gaussian models for different body parts are used to estimate the likelihood of a particular pixel having been generated by those parts. In general, for example, the Gaussian models are used to compute the likelihood of the pixels, each pixel is then labeled either as belonging to exactly one body part (or the background), or to all of them but with different probabilities. Additional acquired or given data can be used to fill in the parts that are missing due to occlusions. Next, statistics of each body part is re-estimated and these are used to estimate the parameters of the Gaussian models for the next image frame (for instance, this estimation can be based on the history of the system and articulation and size constraints). The details of the blob statistics computation (step 340) will be described in detail below.

IV. Details of Components and Operation

A. Real-time Disparity Map Computation

The range image data (step 314 of FIG. 3) can be acquired with any suitable system. For example, a typical system that employs 3D background subtraction and foreground object tracking can be used. One such system (Small Vision from SRI) is based on commercially available software for real-time disparity map computation. Namely, two images (a stereo pair) of the structure are first captured simultaneously. The images captured are then correlated by examining the pixels to determine a disparity (offset) between the images from the stereo pair. These typical systems can usually operate at rates of up to 90 Hz. The following equations describe the relationship between the 3-D coordinates [x y z]' of a point imaged by the stereo pair, the coordinates of the point's perspective projection onto the image plane [X Y]' and the disparity in the two images D (X, Y):

$$x=Xz/f,\ y=Yz/f,\ z=bf/D(X,Y),\ X=xf/z,\ Y=yf/z,\ D(X,Y)=bf/z \quad (1)$$

where b denotes a baseline length, and f is the focal length of the cameras.

B. Tracking Articulated Motion

Figure 4:
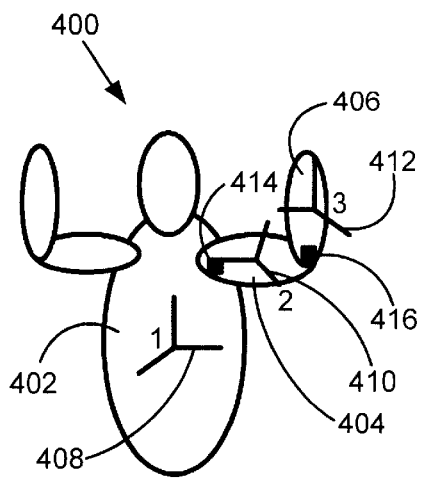
FIG. 4 is articulated model of the present invention illustrating the model as a statistical collection of blobs with local coordinate systems for each blob and associated joints between the blobs.

FIG. 4 is articulated model 400 (step 312 of FIG. 3) of the present invention illustrating the model as a statistical collection of blobs with local coordinate systems for each blob and associated joints between the blobs. In the present invention, a blob is defined as a set of pixels in the image, sharing some similarity. In the present invention it is assumed that all the pixels in the blob are formed by randomly placing points according to the 3-D Gaussian distribution, projecting them onto the image plane and associating the distance to the camera with the projected point. The Gaussian model and the blob are used interchangeably when referring to the statistical parameters of the model.

An articulated object's posture can be parameterized in many different ways. One possibility is to use a redundant set of parameters such as the position and orientation parameters of individual parts and impose the constraints in a Lagrangian form. Another approach is to use the kinematic chain equations and select parameters that are not redundant, such as the orientations of the individual parts and the position of a reference point, as shown as step 312 of FIG. 3 and as the statistical model 400 of FIG. 4. For a human body, the model 400 of FIG. 4 (step 312 of FIG. 3), for instance, includes multiple blobs 402, 404, 406 each having their own coordinate system 408, 410, 412 and being coupled together by associated joints 414, 416. This approach is the type of parameterization preferred by the present invention.

The 3-D posture of an articulated structure is defined by $$\alpha = \{\mu_1, Q_1, Q_2, \ldots, Q_K\} \quad (2)$$

where $\mu_1$ is the center of the reference part, and $Q_k$ is the quaternion representation of the global orientation of the k-th part. In particular, a position vector in the local coordinate system is transformed into the position vector in the global coordinate system by $$P_{global} = R(Q_k) P_{local} + \mu_k,$$

where $\mu_k$ is the position of part k (and the origin of the coordinate system attached to that part) and $R_k = R(Q_k)$ is the rotation matrix corresponding to the quaternion $Q_k$.

Given the posture parameters $\alpha$, the individual positions and orientations of the parts of the articulated structure can be computed. If $J_i^{(k)}$ is the position of the i-th joint in the local coordinate system of the k-th part, the kinematic chain equations can be expressed similar to the representations illustrated in Eq. 3 and FIG. 4 as:

$$\mu_3 = \mu_1 + R'_1 J_{shoulder}^{(1)} - R'_2 J_{shoulder}^{(2)} + R'_2 J_{elbow}^{(2)} - R'_3 J_{elbow}^{(3)} \quad (3)$$

The positions of the joints 414, 416 in their local coordinate systems preferably do not change over time.

To predict the range data, in addition to the articulation model, the models of individual parts are needed, which could range from complex geometrical models to statistical models. Given the probability distribution of the parameters $\alpha$ conditioned on the past of the system $P(\alpha_t|past)$, and a probabilistic image formation model $P(D_t|\alpha_t)$, the dynamics of the system can be represented by a Markov chain as shown in FIG. 5.

The image formation model is a model that describes how the images are generated (discussed in detail with reference to FIG. 6). In the present invention, the image formation model is a generative statistical model that describes how the depth image of an articulated structure is formed by placing points according to the Gaussian models that might occlude each other in a statistical sense.

Figure 5:
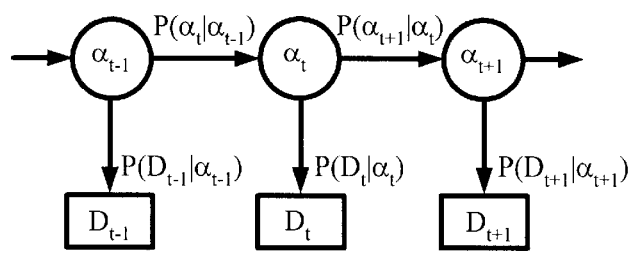
FIG. 5 shows a general tracking framework of the present invention.

FIG. 5 shows a general tracking framework of the present invention. In general, at each time step t, the imaged articulated structure has parameters that are not known. The observed data, Dt, is in the present invention the dense disparity map. The parameters contain the position of a reference point in the structure and the orientations of all parts. The size parameters of the parts are not among these parameters, as these are assumed to be known from an initialization procedure. Also the joint positions in the local coordinate frames are based on the initialization and preferably do not change over time (the shoulder preferably does not traverse over the body).

It is assumed that the state of the system $\alpha_t$ can be augmented (by derivatives, for example), so that the previous state $\alpha_{t-1}$ contains all the necessary information for conditioning the distribution of $\alpha_t$, i.e., $P(\alpha_t|past) = P(\alpha_t|\alpha_{t-1})$. Tracking the structure consists of finding the sequence $\{\alpha_t\}$ that maximizes the likelihood of the observed data $D_t$ (step 324 of FIG. 3). In sections that follow, a statistical image formation model $P(D_t|\alpha_t)$ is defined (FIG. 6), and an approximate, but fast inference technique that updates the parameters of the articulated model based on the current disparity map is defined below.

C. Image Formation Model

Figure 6:
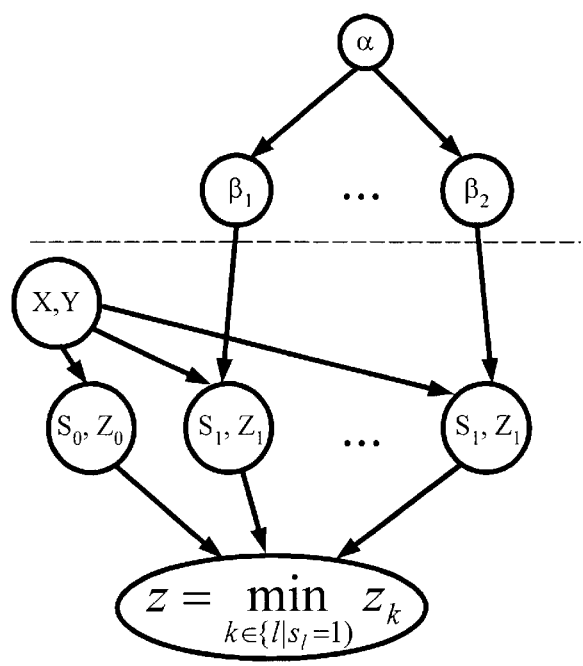
FIG. 6 shows a statistical image formation model of FIG. 4 of the present invention.

FIG. 6 shows a statistical image formation model of FIG. 4 of the present invention. In the previous section, a model of individual parts of the tracked articulated structure was not included. For real-time applications, precision of the model can be reduced in order to reduce the computational complexity. Blob-type statistical models of regions in the image or articulated structure can be used.

In general, FIG. 6 describes the dependence of the observed disparity map D from the state of the articulated structure a (vertical arrows in FIG. 5). Parameters $\beta_k$ are the individual 3-D Gaussian parameters of parts (means and covariance matrices) derived from the parameters $\alpha$ and the known eigenvalues (size parameters). X, Y are imaged coordinates. For each pair (X,Y) the depth is generated by selecting body parts that take part in the imaging process for that particular pixel, drawing the depth measurements according to the statistical model of the individual part (based on 3-D Gaussians) and picking the smallest depth (the point closest to the camera).

The model of FIG. 6 is a generative model that describes a simple but viable model of how an image that is being captured might have been formed. It includes the possibility of mutual occlusions, and these are modeled probabilistically, rather than deterministically. This is a statistical version of z-buffering, which is a deterministic technique well known in computer graphics and vision, but is suitable only for deterministic models (for example a CAD model of a part). In the present invention, any pixel in the image might be generated by any body part (but with variable likelihood), as the body parts are statistical objects.

In particular, as shown in FIG. 4, the blobs of the present invention are preferably defined in the 3-D space on the points satisfying the imaging equations given in Eq. 1. Each pixel in the image is associated with an observation O that consists of a color c=[Y U V]' and a 3-D position p=[x y z]'. It should be noted that other features could be added. An assumption is made that the observation probability density is normal (Gaussian):

$$P_k(O) = N(O; \mu_k, K_k) = \frac{e^{-\frac{1}{2}(O-\mu_k)^T K_k^{-1}(O-\mu_k)}}{(2\pi)^{m/2} |K_k|^{1/2}} \quad (4)$$

The color and position parts of the observation vector are generally not correlated (or rather, this correlation typically cannot be adequately captured by a simple Gaussian model), so the covariance matrix can be assumed to be block-diagonal. In this case, the probability distribution can be expressed as the product of two Gaussians. In the following discussion, as well as in the working example described below, color information is not used. However, the separability of the probability distributions would easily allow the addition of color information. Instead, a concentration is placed on the use of the range data which is directly obtained from the disparity map: $z(X,Y)=bf/D(X,Y)$, and it is assumed that:

$$O(X,Y)=p=[x\ y\ z]'.$$

It should be noted that the points available from the disparity map are on the frontal surface of an imaged human body. Therefore, the Gaussian blobs of the present invention preferably model the points on the parts of the body facing the camera. The parameters of the Gaussian distribution $\beta_k=(\mu_k, K_k)$ capture the position, size and orientation of body part k. The position is determined by the mean $\mu_k$, while the orientation and size are captured in the covariance matrix $K_k$ that can be decomposed as:

$$K_k = R(Q_k)' \Lambda_k R(Q_k) \tag{5}$$

$\Lambda_k$ is a diagonal matrix whose non-zero elements are the eigenvalues of the covariance matrix that determine the size of the body part model along the three orthogonal directions aligned with the local coordinate system attached to the part. $R(Q_k)$ is the rotation matrix that was defined above. Since the data is modeled directly in 3-D, it can be assumed that $\Lambda_k$ (blob size) remains constant in time. This is a significant advantage over previous 2-D blob trackers that have to allow the change of both the eigenvalues and eigen-vectors of the covariance matrix. By keeping the size parameters fixed, the technique of the present invention proves to be more stable.

The individual blob parameters $\beta=\{\beta_k\}_{k=1,N}$ are related to the parameters of the articulation model $\alpha$:

$$\beta=h(\alpha), \text{ or } \beta_k=h_k(\alpha), k=1\ldots N \tag{6}$$

where h is the collection of the kinematic chain equations such as Eq. 2, and the collection of decompositions of covariance matrices (Eq. 5). These relationships are nonlinear due to the quaternion parameterization of the rotation matrices, and this nonlinearity cannot be avoided by other parameterizations.

The measured value of depth $z=bf/D$ can be examined for the pixel (X,Y) of this probabilistic model. As expressed in Eq. 1, the 3-D position vector of the image point is related to the depth z as:

$p=zr$, where $$r = \begin{bmatrix} X/f \\ Y/f \\ 1 \end{bmatrix}. \tag{7}$$

Given the blob k and its parameters $\beta_k$, the distribution of the depth z along the ray r is given by:

$$P_k(z|X,Y,\beta_k)=\gamma N(zr(X,Y);\mu_k, K_k)=N(z;\mu_{zk},\sigma_{zk}^2), \tag{8}$$

where $\gamma$ is a scaling constant. In this equation, index k=0 is reserved for the background model, which can either be formed by observing the empty scene prior to the entrance of the subject, or simply by defining a bimodal distribution in which the likelihood of the background class is very large for the points farther than some threshold. In other words, the simplest background subtraction in range images can be done by simple thresholding. One advantage of the depth stereo map as a visual cue is the easier background subtraction.

The parameters $(\mu_{zk}, \sigma^2_{zk})$ of the normal distribution of z along the line of sight for pixel (X,Y) can be easily identified in the exponent of the Gaussian $N(zr, \mu_k, K_k)$:

$$\mu_{zk} = \frac{r'K_k^{-1}\mu_k}{r'K_k^{-1}r}, \sigma_{zk}^{-2} = r'K_k^{-1}r \tag{9}$$

This leads to a novel way of modeling occlusion in the statistical framework. For each pixel (X,Y), a class indicator variable $s_k \in \{0,1\}$ is defined which indicates whether or not the class k participates in the formation of the depth value z(X,Y). $s_k$ is a random variable whose expectation corresponds to the probability that class k takes part in the imaging process. By reducing the dimensionality of the problem in Eq. 8, the sensitivity of the statistical model is lost to the full 3-D distance between the blob's mean and the object point. Introducing the variables $\{s_k\}$ restores this sensitivity. The mixing proportions $P_k$ can be approximated using the definition of the Gaussian blobs in Eq. 4. Value $\mu_{zk}$ is the most likely value for the blob k along the line of sight r(X,Y). Thus, the probability that blob k will produce a point at (X,Y) can be defined as:

$$p_k = E(s_k) = \frac{N(\mu_{zk}r; \mu_k, K_k)}{N(\mu_k; \mu_k, K_k)} = e^{-d_k(\mu_{zk}r,\mu_k)}, \tag{10}$$

where $d_k(\bullet,\bullet)$ is the Mahalonobis distance based on the covariance matrix $K_k$. In terms of the graphical model in FIG. 6, Eq. 10 determines conditional probability $p(s_k|X,Y,\beta_k)$.

In the model of the image formation process, $s_k$ is set to one with the probability $p_k$. Let $V=\{k|s_k=1\}$ be the set of selected classes ($s_k=1$). For each $k \in V$, a value $z_k$ is drawn from the distribution for the k-th blob. Finally, the range image is formed by selecting the 3-D blob point closest to the image plane:

$$z = \min_{k \in \{l|s_l=1\}} z_k, \text{ where} \begin{cases} z_k \sim P_k\left(z \mid X, Y, \beta_k\right) \\ s_k \sim p_k \end{cases} \tag{11}$$

The parameter $s_0=1$ is kept so that the background model always participates in the imaging process. Eq. 11 describes the deterministic decision in the last stage of FIG. 6.

Given the blob parameters $\beta$ and the set of selected classes V, the distribution of z for the imaging process of Eq. 11 is given by:

$$P(z \mid X, Y, \beta, V) = \sum_{k \in V} P_k(z \mid X, Y, \beta_k) \prod_{l \in V \setminus \{k\}} G_l(z \mid X, Y, \beta_l) \tag{12}$$

$$G_l(z \mid X, Y, \beta_l) = \int_z^\infty P_l(w \mid X, Y, \beta_k) dw$$

The probability of the set V is given by:

$$p(V \mid X, Y, \beta) = \prod_{k \in V} p_k \prod_{l \notin V} (1 - p_l) \quad (13)$$

The complete image formation process for the pixel (X,Y) can be depicted by the graphical model in FIG. 6. The imaging model is conditioned on the probability density of the postures α given the past of the tracker. The parameters $\beta_k$ of individual blobs depend deterministically on the parameters α (Eq. 6). The blob parameters affect the stochastic selection of several depth candidates and finally, the minimum of these candidates (the one closest to the imaging system) is selected.

The process of the present invention has two non-linearities given by Eqs. 6 and 11. By making appropriate linearizations, it might be possible to derive an Extended Kalman Filter that would use the depth values for each pixel as the measurements to update the state of the articulated model. However, it should be noted that the large number of pixels in the disparity map can make this approach computationally expensive.

In summary, for the first stage of the present invention, the disparity map is segmented into different parts of the articulated structure based on the estimated state of the Gaussian mixture using the maximum likelihood principle (an additional mechanism can be used for filling in the missing data due to occlusions). Hence, with the use of Gaussian models with disparity maps and stereo cues, the passive and non-intrusive tracking system of the present invention computes disparity based on correlation to allow less sensitivity to the intensity changes. Consequently, the articulated structure or object (210 of FIG. 2) is effectively and efficiently tracked in real-time with the 3-D tracking system present invention.

D. Re-estimation

In order to achieve real-time speeds and utilize all the available pixels in the disparity image, a two-stage process can be used in updating the state of the articulation model α. These two stages deal with the two halves of the graphical model shown separated by a dashed line in FIG. 5. It should be noted that re-estimation is simply one method for achieving fast approximate estimation of parameters of the image formation model. Other suitable methods of optimizing the image formation model can be used that have different compromises between speed, precision, robustness, etc.

a) Re-estimation of the Blob Parameters β

Without the nonlinear process of Eq. 11, the lower half of FIG. 5 would represent a mixture of Gaussians (with distributions given by Eq. 4), which could be trained using several iterations of an estimation technique as described in "Maximum likelihood from incomplete data via the EM algorithm (with discussion)," by A. P. Dempster, N. M. Laird, and D. B. Rubin, J. R. Statist. Soc. B 39, pp. 1–38, 1977, which is incorporated herein by reference. In this technique, the pixels in the disparity map would be assigned a probability for each blob k. Or, alternatively, each pixel could be assigned to a single class. The first version corresponds to soft and the other to hard clustering of the data. In the case of hard clustering, a support map can be computed (E step):

$$S(X, Y) = \arg\max_k \log(P_k(x, y, z)) \quad (14)$$

The blob parameters used in the classifications should be predicted from the previous frames. Given the support map, the blob parameters can be re-estimated using a well-known formula for Gaussian training (M step):

$$\hat{\mu}_k \approx \frac{1}{N_k} \sum_{S(X,Y)=k} O(X, Y) = \frac{1}{N_k} \sum_{S(X,Y)=k} zr, \quad (15)$$

$$\hat{K}_k \approx \frac{1}{N_k} \sum_{S(X,Y)=k} (O - \hat{\mu}_k)(O - \hat{\mu}_k)',$$

For 2-D tracking, for each new frame, only a single iteration of Eq.14 and 15 can be applied, starting from the previously estimated values of the blobs' parameters.

b) Occlusion Detection and Filling the Missing Data

If Eq. 11 is neglected, numerous occlusion problems are created. The main problem occurs because the blobs, though 3-D objects, compete on the 2-D image plane. As the result of the application of Eqs. 15 and 16, the occluding blob will push the occluded blob away, considerably affecting its mean and covariance matrices. The appropriate solution is based on maximizing the probability in Eq. 12, averaged over all possible sets V and blob parameters β. It can be shown that with certain approximations, this solution reduces to inserting into the Eq. 15 and 16 the estimate of the data missing due to occlusions. For the sake of brevity, this derivation is omitted, but occlusion handling is discussed in detail below.

In particular, Eqs. 14 and 15 are approximations based on hard clustering to the exact EM algorithm and they take into account the visible data when updating the blob's parameters. To handle occlusions, similar to hard decision approximations, after the pixel (X,Y) has been assigned to a class k*=S(X,Y), the image formation model of the previous section can be examined to estimate which blobs had made it into the selected set V={k|$s_k$=1} before the minimum value z(X,Y)=$z_k$ was picked. Instead of the soft decision based on the mixing probabilities, a hard decision is made by thresholding the mixing probabilities in Eq. 10 and estimate the set V as $$\hat{V} = \{k | p_k > p_T, \mu_{zk} r > z\}, \quad (16)$$

where $\rho_T$ is a threshold on the mixing probabilities. In essence, the assumption being made is that the blobs in the estimated set V would have been likely to produce a point at the location X,Y, but were occluded by the winner k*. Not knowing which value $z_k$ was drawn form their distributions (since the point was occluded), the best guess is the mean of the distribution of z along the line of sight r. i.e, $\hat{z}_k = \mu_{zk}$, where $\mu_{zk}$ is given in Eq. 9. Now, the estimation eqs can be rewritten as:

$$\hat{\mu}_k \approx \frac{1}{N_k}\left(\sum_{S(X,Y)=k} zr + \sum_{k \in V(X<Y)-\{S(X<Y)\}} \mu_{zk} r\right) \quad (17)$$

$$\hat{K}_k \approx \frac{1}{N_k}\left(\begin{array}{c}\sum_{S(X,Y)=k}(zr - \mu_k)(zr - \mu_k)' + \\ \sum_{V(X,Y)-\{S(X,Y)\} \ni k}(\mu_{zk}r - \mu_k)(\mu_{zk}r - \mu_k)'\end{array}\right)$$

where $N_k$ is the total number of pixels used for updating the parameters of the blob k. Starting with the previous estimate of the blob parameters $\beta_k(t|t-1)$ and applying these equations to the new frame, new estimates of these parameters are produced that take into account all pixels in the disparity map in an approximate, but computationally very efficient manner. These new estimates are forwarded to the second stage of the estimation technique of the present invention (the upper half of FIG. 5) and are estimates of the articulation model parameters $\alpha$, the goal of the tracking system and method of the present invention.

1) EM Techniques for Inference of $\beta$

From the above discussion and FIG. 5, it can be seen that a better inference in the lower part of the formation model is based on iterating the soft-clustered versions of Eqs. 14, 16 and 17. In particular, in the first part of each of the two estimate equations in Eq. 17, the measured depth zr (see Eq. 7) should be scaled by $p(k|x,y,z)=P_k(x,y,z)/\Sigma P_i(x,y,z)$, where $P_k$ is given in Eq. 4. In the second part (occluded data filling), the estimated depth should be scaled by the probability $\rho_k$ of Eq. 10 and thus the set V should include all blobs.

Such an approach may lead to a better estimate of the blob parameters in the first stage of the inference process, but even though only three or four iterations of EM would be sufficient, this may harm the real-time performance of the system. For instance, using soft clustering instead of the hard decisions in Eqs. 14 and 16 and still performing only a single re-estimation of blob parameters also reduces the speed a bit (as more multiplications become necessary), but this overhead is much less significant. In the working example, to achieve the best frame rate, Eqs. 14 and 16 were used as they are shown.

c) The Extended Kalman Filter (EKF) with Implicit Articulation Constraints

Since dynamical systems are preferably being tracked, the transition of the system (horizontal direction in FIG. 4) can be captured by a linear system (for larger orders, augmenting the state a with its derivatives can be performed). It is assumed that Eqs. 17 and 18 represent noisy measurements of the true values of $\beta$. Therefore, the estimation of articulation model parameters can be done in the Extended Kalman Filtering (EKF) conventional framework, where the transition is captured by a linear equation (with added noise) and the measurement equations are nonlinear and noisy:

$$\alpha_t = F\alpha_{t-1} + \text{noise}$$

$$\hat{\beta}_t = h(\alpha_t) + \text{noise} \qquad (18)$$

where h is given by Eqs. 3, 5, and 6 in Section 2. The EKF linearizes h around the current estimate of $\alpha$ to create the Jacobian matrix that plays the role of the measurement matrix in the regular linear Kalman Filter.

The parameterization of the articulated model is non-redundant, so that each combination of the parameters corresponds to a posture in which the blobs are connected at the joints. Thus, the EKF enforces the articulation constraints on the blob parameters. Matrix F captures the dynamics of the system, but in the simplest version it can be set to the identity matrix. It should be noted that the present invention can also be simplified and used to track independent self occluding objects without the articulation constraints.

IV. Working Example

In one working example on a digital system, such as a computer system, a simple initialization technique can be used in which the object or subject (human body) is expected to assume a certain pose based on marks in the image, after which the different regions in the image are assigned to different body parts (e.g., the head, torso, upper arm, and forearm). The statistical parameters of the initial blobs are computed, and the eigenvalues of the covariance matrices are found. The joints are also assumed to be at certain fixed positions in the image plane during initialization. Although this initialization routine is sufficient for testing the overall system, the effects of bad initialization can produce poor results. However, the model initialization problem can be solved with some of the heuristic techniques used by other conventional tracking techniques.

In one working example, a simple two-part model of the upper human body was used consisting of head and torso blobs. The system of the present invention was insensitive to scale changes and recovers from complete breakdowns such as the ones that inevitably occur when the subject wanders completely out of the field of view and then returns. To make the recovery from breakdowns faster, gravity and antigravity forces can be applied. The gravity force, pulling the blob down, is applied to the torso blob, while the antigravity force, pulling the blob up is applied to the head blob. Apart from robustness to scale change, the advantage of the tracking system of the present invention is its insensitivity to illumination changes and the changes in the far background. The tracking system is not dependent on the color information, though it can be easily incorporated in the model as an additional modality.

Further, in addition to segmenting the head and torso in the images, the tracking system can also provide 3D positions. Using the two connected blobs considerably adds to the robustness of the tracking system. Although in other systems a single blob tracker could leave the head and travel down to the torso, the EKF measurement equations of the present invention assume constant eigenvalues of the covariance matrix, thus preventing the blobs from consuming each other. In one example, the tracking system operated at around 20 Hz (including disparity map computation) on a 333 MHz personal computer system, and this speed was achieved without much effort invested in optimization. Also, the tracking system of the present invention can be combined with existing (such as less robust but more precise) face trackers and face pose estimators to create a robust and precise system.

In a second working example, an articulated structure consisting of four blobs representing the head, torso, lower arm and the upper arm were tracked. Overall, the tracking system proved to be insensitive to depth-dependent scale changes, as this is taken into account in Eq. 1. In fact, scale changes in the image even helps the tracker indirectly, as the size parameters of the 3-D blob model are fixed, and the scale change due to the perspective projection becomes an additional depth cue.

The potential applications of the articulated tracking system of the present invention are in vision-based interfaces, such as tracking people, detecting pointing gestures, and computing the direction of pointing. The captured motion can also be used to animate computer graphics characters or the avatars in video conferencing software and VR applications. The tracking system can also be used as the first stage of a gesture understanding system.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for tracking an object having plural parts, wherein the object is tracked as an articulated structure, the method comprising:

obtaining digital representations of the object from multiple viewpoints;

generating disparity maps between the digital representations; and digitally segmenting the disparity maps and modeling selected parts of the object using a predefined 3-D Gaussian statistical model of the object with fixed eigenvalues.

2. The method of claim 1, wherein the predefined statistical model is comprised of sub-models of the parts each defined by multiple parameters including size parameters comprised of at least one of position and orientation.

3. The method of claim 1, further comprising using the statistical model to recognize mutual object part occlusions.

4. The method of claim 3, further comprising filling in data for the occluded object parts with the statistically recognized mutual occlusions.

5. The method of claim 1, wherein the digital representation of the object is comprised of plural digital images sequentially ordered so that movement of the object is capable of being tracked.

6. The method of claim 5, further comprising correlating pixels of the multiple images to one another to determine the disparity map at each pixel of the images.

7. The method of claim 5, further comprising determining two dimensional coordinate points of the pixels and transforming each pixel into appropriate three dimensional points using its disparity map and the coordinate points.

8. The method of claim 7, further comprising using the three dimensional pixel points to compute a likelihood estimate of a posture of the articulated structure for each object part.

9. The method of claim 8, further comprising associating the pixel points with an object part having the highest likelihood estimate to define a segmentation map of the pixel points.

10. The method of claim 9, further comprising re-estimating pixel point associations by recomputing statistical parameters of the Gaussian models for selected object parts.

11. The method of claim 2, wherein the object is a human body and the parts of the object are human body parts.

12. The method of claim 11, wherein the statistical model is comprised of a human body represented by a human torso body connected to segmented upper and lower human body part limbs.

13. A method for tracking a human body having multiple body parts comprising:

obtaining a digital representation of the human body;

predefining generative statistical models of image formation for each body part and using the statistical models to recognize mutual body part occlusions;

filling in data for the occluded body parts with the statistically recognized mutual occlusions.

14. The method of claim 13, wherein the body parts are tracked from frame to frame in image sequences as an articulated structure in which the body parts are connected at associated joints.

15. The method of claim 14, wherein the predefined statistical models are Gaussian models defined by multiple parameters including size parameters comprised of at least one of position and orientation.

16. The method of claim 15, wherein the image sequences are ordered sequentially to simulate motion and further comprising correlating pixels of the multiple images to one another to determine a disparity map at each pixel of the images.

17. The method of claim 16, further comprising determining two dimensional coordinate points of the pixels and transforming each pixel into appropriate three dimensional points using its disparity map and the coordinate points.

18. The method of claim 17, further comprising using the three dimensional pixel points to compute a likelihood estimate of a posture of the articulated structure for each body part.

19. The method of claim 18, further comprising associating the pixel points with a body part having the highest likelihood estimate to define a segmentation map of the pixel points.

20. The method of claim 19, further comprising re-estimating pixel point associations by recomputing statistical parameters of the Gaussian models for selected body parts.

21. The method of claim 13, wherein the body parts are capable of moving and changing shape and orientation freely.

22. The method of claim 13, wherein the statistical models are graphical Bayesian networks that formalize generative processes to allow probabilistic inference.

23. The method of claim 14, further comprising determining a maximum likelihood estimate of a posture of the body parts of the articulated structure.

24. The method of claim 16, further comprising segmenting the disparity map into different body parts of the articulated structure using estimated states of Gaussian mixtures.

25. The method of claim 24, further comprising re-estimating statistical properties of the body parts.

26. The method of claim 25, further comprising enforcing articulation constraints to improve tracking performance by modeling the dynamics of the tracked object.

27. The method of claim 26, wherein the articulation constraints are enforced with an extended Kalman Filter.

28. An object tracking system for dynamically tracking articulated structures within a sequence of images, wherein the structures are made of segmented parts, comprising:

a predefined statistical model of each articulated structure;

a depth map processor that computes range image data and segments a disparity map into different parts of the structure;

a pixel classification processor that classifies pixels of each image within defined part segments; and an occlusion detector and handler that estimates missing data and resolves the missing data as occluded parts.

29. The object tracking system of claim 28, further comprising a re-estimation processor that re-computes statistical parameters of the statistical models for different parts.

30. The object tracking system of claim 29, further comprising an enhancing filter that enhances the re-computations and a blob computation processor that computes individual model parameters.

31. The object tracking system of claim 28, wherein the statistical model is a multi-dimensional Gaussian model parametrically defined with part segments.

32. The object tracking system of claim 31, wherein the Gaussian model includes a mean value parameter and a covariance matrix parameter.

33. The object tracking system of claim 32, wherein the likelihood of a particular measurement depends on the distance from the mean value.

34. The object tracking system of claim 32, wherein the covariance matrix allows additional variability in one direction than in another.

35. The object tracking system of claim 32, wherein the covariance matrix is related to an ellipsoid describing an amount of variation in different directions of the parts.

36. The object tracking system of claim 35, wherein the covariance matrix has eigenvalues that are fixed allowing changes in position and orientation in space of the ellipsoid without changing the shape of the ellipsoid.

37. The object tracking system of claim 36, wherein the eigenvalues of the Gaussian model are fixed and used as a model of a human body part.

38. The object tracking system of claim 31, wherein the pixel classification processor determines coordinates of each pixel and uses the coordinate determinations with the disparity map to transform each pixel into an appropriate multi-dimensional point.

39. The object tracking system of claim 38, wherein the Gaussian model uses the multi-dimensional points for each pixel to compute a likelihood estimate of a posture of the articulated structure.

40. The object tracking system of claim 39, wherein the part of the Gaussian model with the best likelihood estimate of a particular pixel is considered as having been generated by that part.

41. The object tracking system of claim 39, wherein the part of the Gaussian model with the best likelihood estimate of the particular pixel is labeled and stored having a quantified probability that it was generated by that part.

42. The object tracking system of claim 38, wherein the pixel classification processor produces results comprised of a segmentation map that labels different pixels as belonging to different parts.

43. The object tracking system of claim 42, wherein the occlusion detector and handler uses the segmentation map, the Gaussian parameters and the range image data of the depth map to produce a set of additional multi-dimensional points at the occluded parts.

44. The object tracking system of claim 42, wherein the occlusion detector and handler produces a probability of occlusion for each pixel and a best estimate of occluded values.

45. The object tracking system of claim 43, wherein the occlusion detector and handler computes for each pixel an optimum depth value expected to be formed by a particular part of the statistical model and determines if an optimum value according to the particular part is significantly larger than a measured value and if the segmentation map has another part identified as having been generated by the particular part for assuming whether occlusion of the particular part occurs.

46. The object tracking system of claim 45, wherein if occlusion is assumed, the optimum measurement is added as the measurement for the particular part in order to fill in the occluded missing data.

47. The object tracking system of claim 43, wherein probabilities of different parts for each pixel exists and the missing data is added in probabilistic form, wherein with each added point a weight is added to control affects of re-estimation of Gaussian model statistics.

48. The object tracking system of claim 38, further comprising a re-estimation processor that re-computes means and covariance matrices as statistical parameters of the statistical models for different parts.

49. The object tracking system of claim 48, wherein recomputation of means and covariance matrices includes estimating mean values for each part by averaging all the multi-dimensional points corresponding to the pixels associated with that part in the segmentation map and the estimated missing data.

50. The object tracking system of claim 49, wherein the covariance matrices are computed using the segmentation map and the estimated missing data.

51. The object tracking system of claim 50, wherein the estimated means and covariance matrices and estimated speed and acceleration parameters of all parts are used to produce expected parameters of the articulated structure.

52. The object tracking system of claim 51, wherein an Extended Kalman Filter based on the articulation model is used to produce the expected parameters.

53. The object tracking system of claim 51, wherein nonlinear equations are related to the state of the articulated model with means and covariance matrices that include assumptions of constant size of a part and kinematic chain equations describing connection of the parts in the structure.

54. The object tracking system of claim 53, wherein dynamics of the articulated model are captured by a transition matrix and wherein the nonlinear equations are linearized with the Extended Kalman Filters and a state is found that best fits the dynamics and the measurements of the model.

55. The object tracking system of claim 46, wherein additional data defined by at least one of acquired data and given data, is used to fill in the parts that are missing due to occlusions.

* * * * *

UNITED STATES PATENT AND TRADEMARK OFFICE
CERTIFICATE OF CORRECTION

PATENT NO. : 6,674,877 B1
DATED : January 6, 2004
INVENTOR(S) : Jojic et al.

It is certified that error appears in the above-identified patent and that said Letters Patent is hereby corrected as shown below:

Column 10,
Line 31, "a" should be changed to -- $\alpha$ --

Column 14,
Line 35, equation should appear as follows:

$$z(X,Y) = z_{k^*}$$

Line 53, equation should appear as follows:

$$\hat{\mu}_k \approx \frac{1}{N_k} \left( \sum_{S(X,Y)=k} zr + \sum_{k \in V(X,Y)-\{S(X,Y)\}} \mu_{zk} r \right) \quad (17)$$

Column 15,
Line 34, "a" should be changed to -- $\alpha$ --

Signed and Sealed this

Eighth Day of June, 2004

JON W. DUDAS
*Acting Director of the United States Patent and Trademark Office*